(12) United States Patent
Ucgun (10) Patent No.: US 10,330,135 B2
(45) Date of Patent: Jun. 25, 2019

(54) ADJUSTMENT DEVICE FOR EXERCISE APPARATUSES

(71) Applicant: BASI SYSTEMS PILATES SANAYI TICARET A.S., Istanbul (TR)

(72) Inventor: Mumin Cengiz Han Ucgun, Istanbul (TR)

(73) Assignee: BASI SYSTEMS PILATES SANAYI TICARET A.S., Istanbul (TR)

(*) Notice: Subject to any disclaimer, the term of this patent is extended or adjusted under 35 U.S.C. 154(b) by 172 days.

(21) Appl. No.: 15/316,845

(22) PCT Filed: Dec. 31, 2014

(86) PCT No.: PCT/TR2014/000533
§ 371 (c)(1),
(2) Date: Dec. 7, 2016

(87) PCT Pub. No.: WO2016/013994
PCT Pub. Date: Jan. 28, 2016

(65) Prior Publication Data
US 2017/0136287 A1     May 18, 2017

(30) Foreign Application Priority Data
Jul. 21, 2014  (TR) .............................. a 2014/08606

(51) Int. Cl.
*F16B 7/04*     (2006.01)
*F16D 1/08*     (2006.01)
(Continued)

(52) U.S. Cl.
CPC ............ *F16B 7/042* (2013.01); *A63B 21/159* (2013.01); *A63B 22/0002* (2013.01);
(Continued)

(58) Field of Classification Search
CPC .............. A63B 21/159; A63B 21/4017; A63B 21/4033–4035; A63B 22/0002; A63B 22/0005; A63B 22/0007; A63B 22/0046; A63B 22/0605; A63B 222/0041; A63B 222/0611; A63B 222/0617; A63B 222/0623; A63B 2225/09; F16B 7/042;
(Continued)

(56) References Cited

U.S. PATENT DOCUMENTS 4,621,805 A * 11/1986 Chen ................... A63B 22/0005
                                                                    403/93
6,074,328 A      6/2000 Johnson
(Continued)

FOREIGN PATENT DOCUMENTS

CN           2695043 Y     4/2005
CN         201533964 U     7/2010
(Continued)

*Primary Examiner* — Josh Skroupa
(74) *Attorney, Agent, or Firm* — Gokalp Bayramoglu (57) ABSTRACT

An adjustment device for exercise apparatuses which comprises a flange, a coupling body coupled to the flange by a pressure bar, an adjustment protrusion and a pressure pin, a coupling ring through which the coupling body is passed, a vertical arm connected to the coupling body so as to be adjusted in the back and forth direction and rotationally, and a coupling arm connected to the vertical arm.

8 Claims, 9 Drawing Sheets

(51) Int. Cl.
*A63B 22/00* (2006.01)
*A63B 21/00* (2006.01)
*A63B 22/06* (2006.01)

(52) U.S. Cl.
CPC ...... *A63B 22/0005* (2015.10); *A63B 22/0007* (2013.01); *A63B 22/0046* (2013.01); *A63B 22/0605* (2013.01); *F16B 7/044* (2013.01); *F16D 1/0864* (2013.01); *A63B 21/4017* (2015.10); *A63B 2022/0041* (2013.01); *A63B 2022/0617* (2013.01); *A63B 2225/09* (2013.01); *Y10T 403/32336* (2015.01); *Y10T 403/598* (2015.01); *Y10T 403/604* (2015.01)

(58) Field of Classification Search
CPC ......... F16B 7/044; F16B 7/0473; F16B 7/14; F16D 1/0864; Y10T 403/32114; Y10T 403/32336; Y10T 403/32344; Y10T 403/32361; Y10T 403/32483; Y10T 403/32508; Y10T 403/39; Y10T 403/3906; Y10T 403/3933; Y10T 403/4694; Y10T 403/591; Y10T 403/598; Y10T 403/599; Y10T 403/604; Y10T 403/7077; Y10T 403/7079

USPC ......... 403/66, 93, 94, 96, 109.3, 109.6, 187, 403/188, 192, 263, 322.1, 324, 325, 328, 403/377, 378; 482/908
See application file for complete search history.

(56) References Cited

U.S. PATENT DOCUMENTS

| | | | |
|---|---|---|---|
| 6,394,687 B1* | 5/2002 | Lee | E05D 11/1007 403/322.1 |
| 6,659,917 B1* | 12/2003 | Tacx | A63B 69/16 482/63 |
| 7,604,579 B2* | 10/2009 | Isacowitz | A63B 21/04 482/129 |
| 10,010,746 B1* | 7/2018 | Hsu | A63B 22/0046 |
| 2006/0003871 A1* | 1/2006 | Houghton | A63B 22/0005 482/57 |
| 2009/0253559 A1 | 10/2009 | Maresh | |
| 2012/0201597 A1* | 8/2012 | Comerford | E04C 5/165 403/306 |

FOREIGN PATENT DOCUMENTS

| | | |
|---|---|---|
| EP | 1588743 A1 | 10/2005 |
| JP | 2011085715 A | 4/2011 |
| WO | WO2008008820 | 1/2008 |

* cited by examiner

ADJUSTMENT DEVICE FOR EXERCISE APPARATUSES

CROSS REFERENCE TO RELATED APPLICATIONS

This application is the national phase entry of international Application No. PCT/TR2014/000533 filed on Dec. 31, 2014, which is based upon and claims priority to Turkish Patent Application No. 2014/08606, filed on Jul. 21, 2014, the entire contents of which are incorporated herein by reference,

FIELD OF THE INVENTION

The present invention, relates to an adjustment device for exercise apparatuses. The present invention particularly relates to a device, to which a pull mechanism held by the hand or foot of a user is connected in a Pilates apparatus. Thus, the present invention aims to develop an adjustment device for use in the so-called Pilates exercise apparatus, which can be rotated to any direction and allows to make distance and height adjustments in an easy manner.

BACKGROUND

Sports are nowadays an essential activity in the developing societies. Now, sportive activities are performed not by professionals only, but also by people from any ages and social classes, such as the young, and elder people, town-dwellers, farmers, housewives, etc. In this context, sport apparatuses are being developed which allow performing sportive activities everywhere. The sport apparatus called as the Pilates equipment is one of those apparatuses which has been developed in the last forty years.

One feature of the so-called Pilates apparatus, as one of such sport apparatuses, is that it was used originally as a physiotherapy device. In time, this apparatus has turned into exercise apparatuses, which do not excessively wear down the user, but provide good physical conditioning. There are many different constructions and configurations of these sport apparatuses. Some of these apparatuses are used while standing, or sitting, or while laying down, in order to exercise particularly the muscles of the waist, the arms, and the legs. Almost all Pilates apparatuses according to the prior art have been designed in a stationary form on which the respective user lays down, or sits, or rests against the apparatus so as to carry out various physical movements. Some of such apparatuses, in turn, are devised with additional holding bars, so that the user holds them by hand or attaches them to the foot and exercises the muscles of the arms and legs accordingly. Due to the flexible spring tools included in many of these holding bars, these apparatuses provide good arm muscle exercises. However, since the holding bars are fastened to a fixed point on the Pilates apparatus, they can not provide the same efficiency for all users. Additionally, it does not have a flexible adjustment system, allowing one user to make exercises in different positions. According to the prior art, the international patent application WO2008008820 describes a device in Pilates exercise apparatuses, which allows to adjust the holding bars according to the position occupied by the respective user. The construction described in that document allows a holding bar fastened to a Pilates apparatus to be adjusted rotationally at different angles, different heights and distances. However, the adjustment in the claimed construction is not made easily. Since the adjustment of the turning angle is provided using a draw pin, it is particularly difficult for female users to draw the pin and make the necessary adjustment. Concerning the apparatuses to which said adjustment mechanism is applied according to the document, it can be seen that the adjustment of the turning angle is difficult and the mechanism to which the holding bar is connected is inefficient.

SUMMARY OF THE INVENTION

The object of the present invention is to develop a construction for an adjustment device for exercise apparatuses, which can be fastened to any kind of Pilates apparatuses, of which the turning angle can be easily adjusted, and of which the holding bars are easily attached and removed.

The device of the present invention is characterized in that it can be mounted to any kind of Pilates apparatuses and it provides an outstanding flexibility and convenience in the adjustment of the turning angle.

The device according to the present invention is further characterized in that the fastening angle is also adjustable besides the adjustability of the turning angle, the height and distance of the device to the Pilates apparatus.

The device according to the present invention is also characterized in that fastening holes are formed on a cylindrical tube which is more handy as compared to protrusion-like fastening holes which bind the holding bar to the adjustment mechanism according to the prior art.

In order to provide a better understanding of the device according to the present invention, it shall be referred to the figures.

REFERENCE NUMBERS OF PARTS AND SECTIONS IN FIGURES ILLUSTRATING THE PRESENT INVENTION

10—Body of the Pilates apparatus
11—Side wall of the Pilates apparatus
12—Adjustment device
13—Flange
   4a—Coupling screw hole
   4b—Adjustment holes 4c—Body seat
4d—Flange protrusion
14—Coupling ring
5a—Pin hole
15—Coupling body
6a—Channel
6b—Pin seat
6c—Arm seat
6d—Pressure bar
6e—Adjustment protrusion
6f—Pressure bar
6g—Pressure pin
6h—Pressure spring
6i—Screw hole
16—Tightening apparatus
7a—Tightening screw
7b—Tightening bar
17—Vertical arm
8a—Tightening seat
8b—Coupling arm seat
18—Coupling arm
9a—Coupling arm protrusion
9b—Tightening nut or segment
9c—Spring fastening holes
9d—Arm sheath
9e—Arm extension

DETAILED DESCRIPTION OF THE INVENTION

Figure 1:
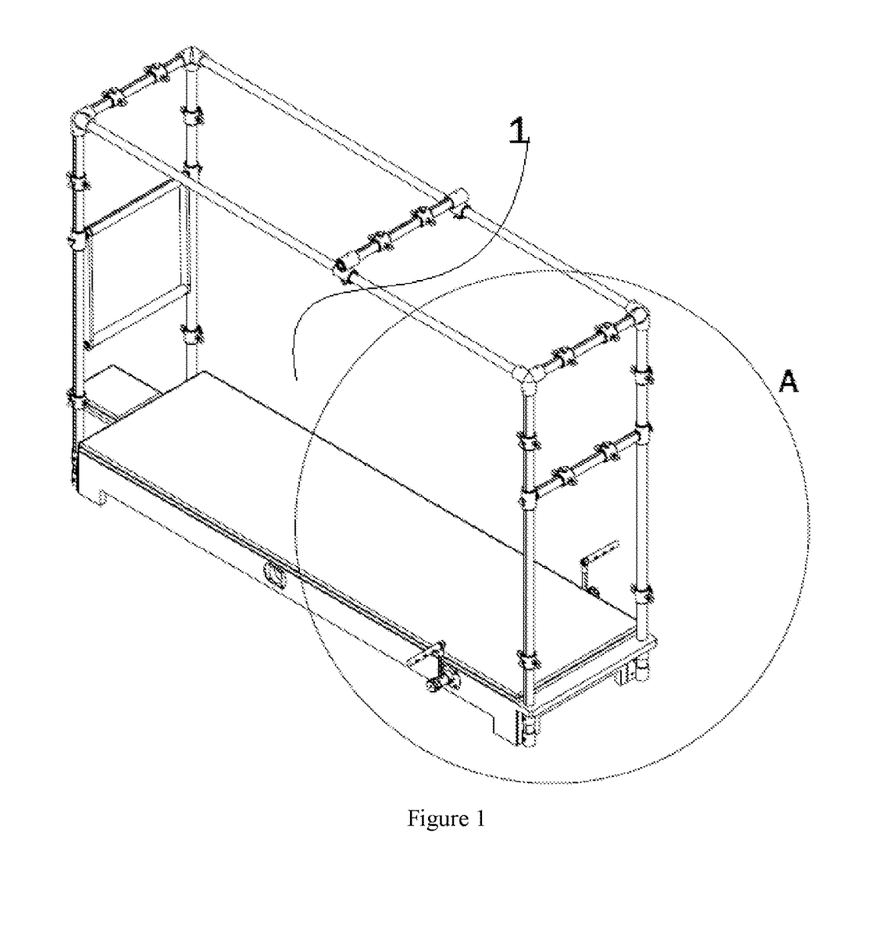
FIG. 1 illustrates the case in which the device according to the present invention is fastened to the base part of a large-size Pilates apparatus.
Figure 2:
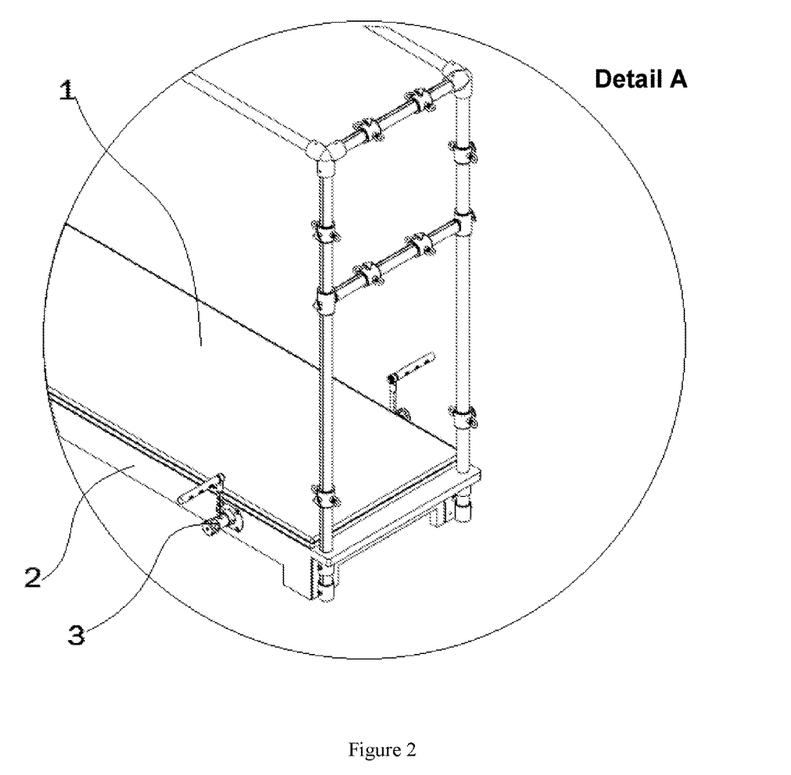
FIG. 2 provides an enlarged illustration of the case shown in FIG. 1.
Figure 3:
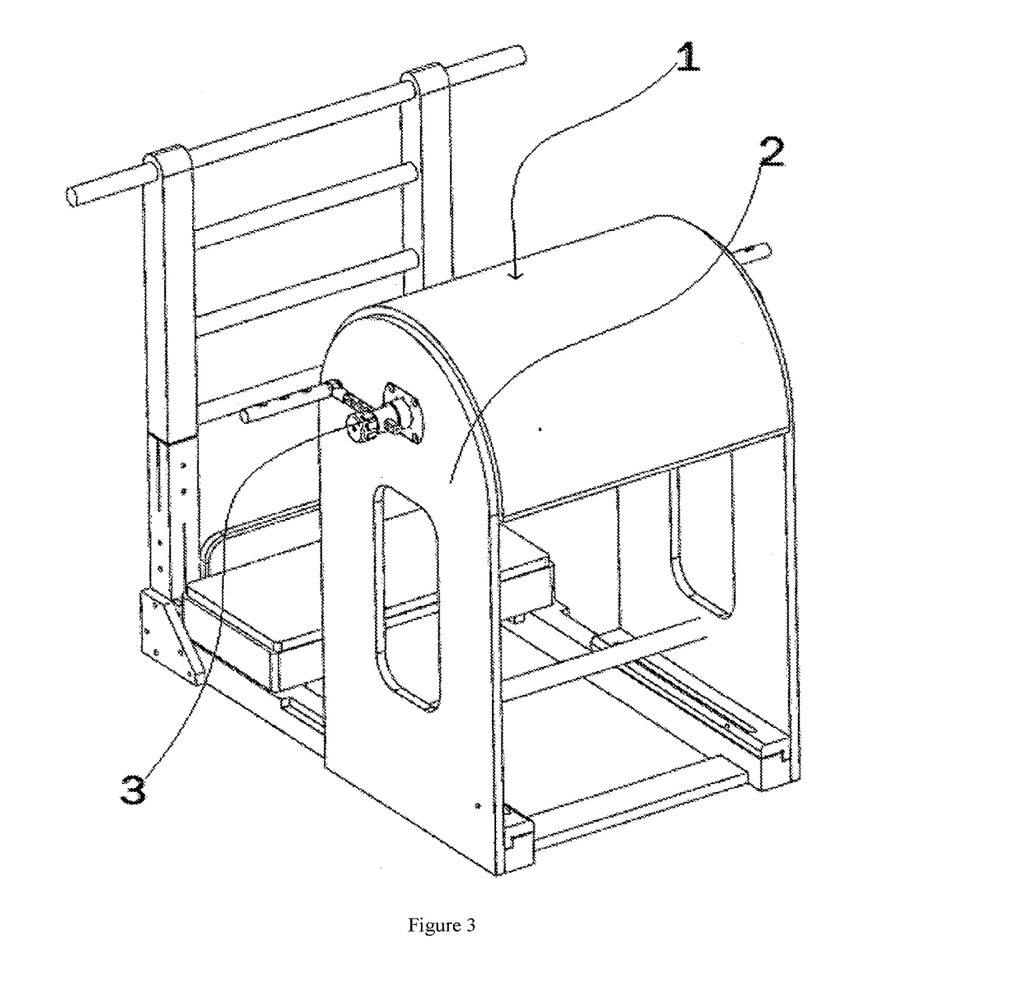
FIG. 3 illustrates the case in which the device according to the present invention is applied to a sort of Pilates apparatus which allows performing physical exercises in a standing manner.
Figure 4:
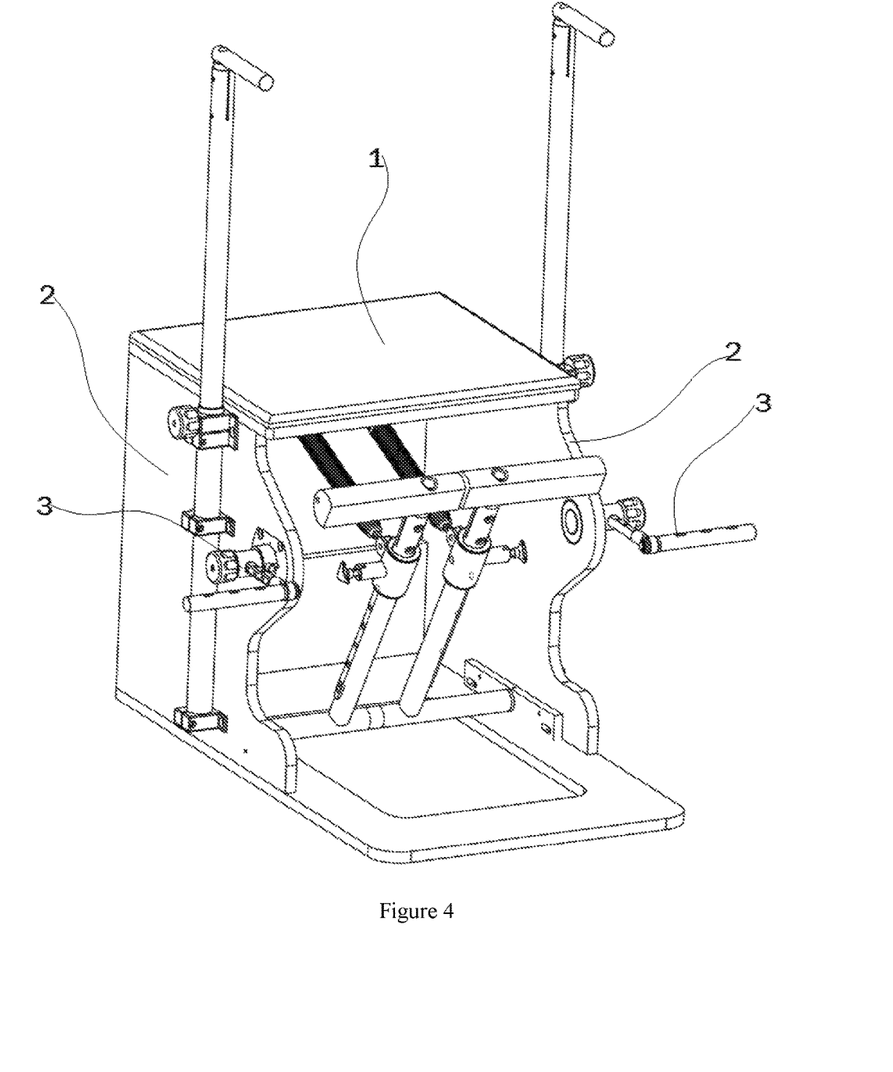
FIG. 4 illustrates the case in which the device according to the present invention is applied to a central-side body of a sort of Pilates apparatus which allows performing physical exercises in a standing or leaning manner.
Figure 5:
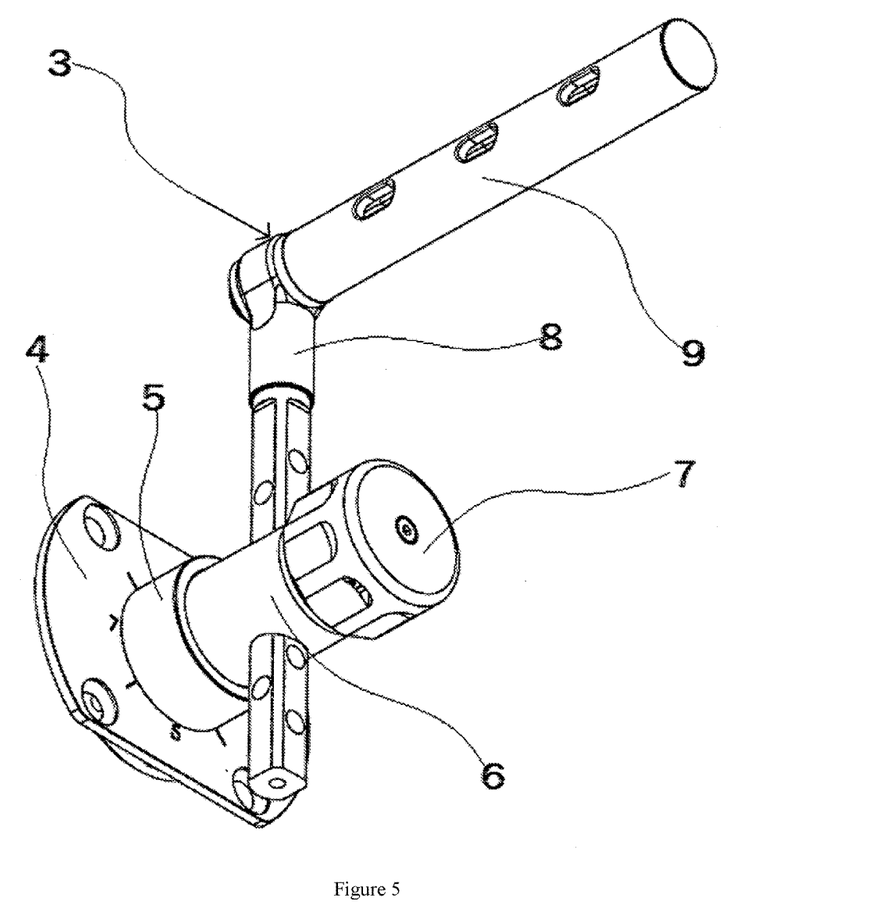
FIG. 5 is a perspective illustration of the device according to the present invention.
Figure 6:
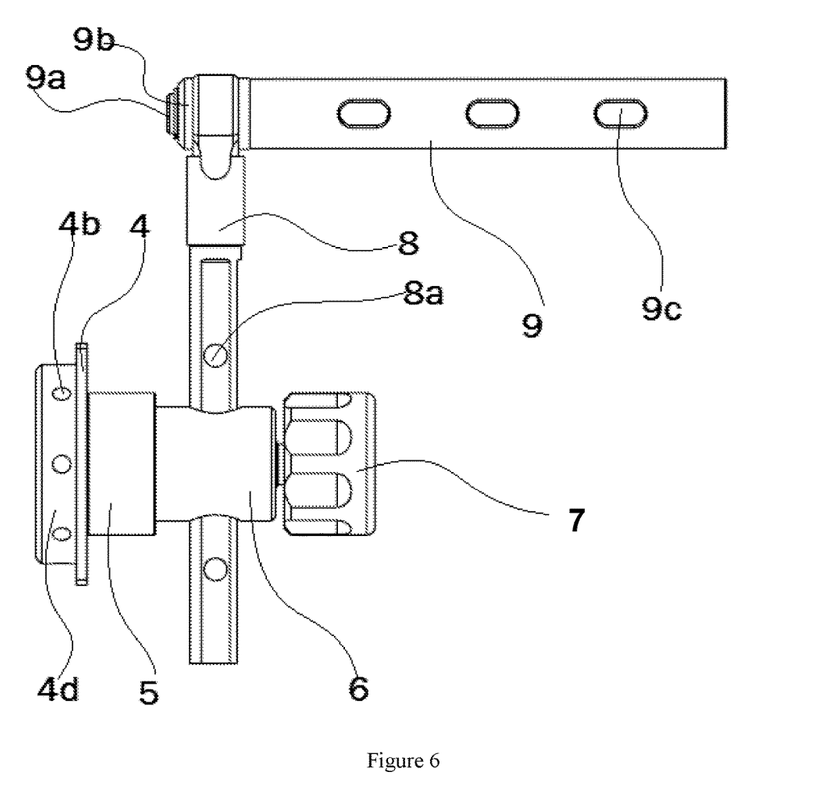
FIG. 6 is a side perspective illustration of the device according to the present invention.
Figure 7:
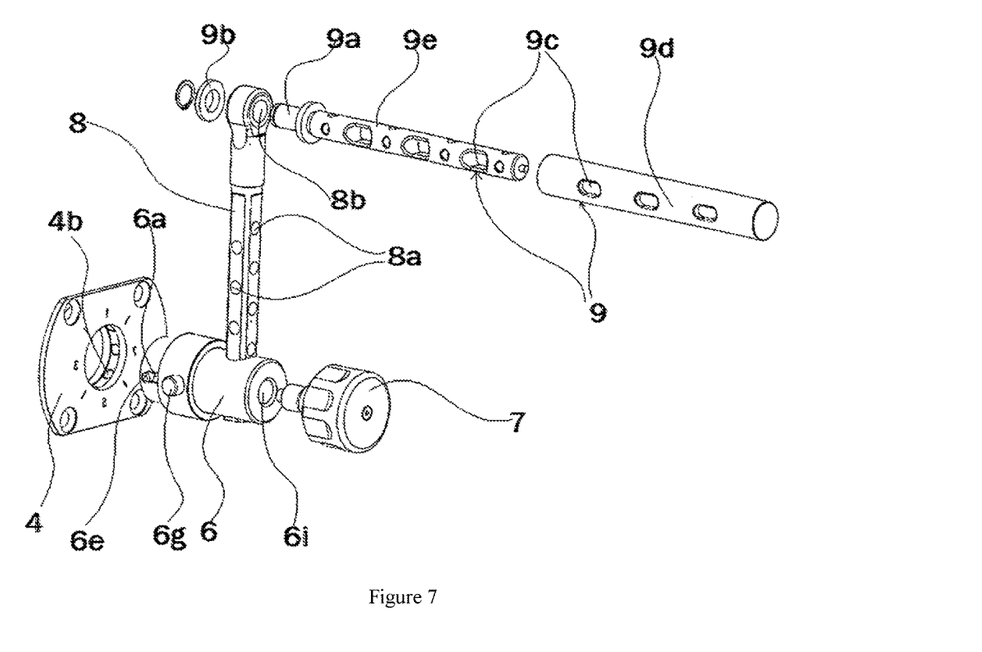
FIG. 7 is an exploded perspective illustration of the device according to the present invention.

The adjustment device for exercise apparatuses according to the present invention can be used in any kind of Pilates and similar sport apparatuses or physiotherapy devices. However, to make clear the subject matter herein, only some figures will be given and the description will be made referring to these figures only. The present invention, however, should not be limited to these figures. Accordingly, FIG. 1, FIG. 2, FIG. 3 and FIG. 4 show a Pilates exercise apparatus. Here, an adjustment device (3) according to the present invention is mounted to a side wall (2) of a body (1) of the Pilates apparatus. However, when it is required or desired to do so, it can also be mounted to any part of the body (1) of the Pilates apparatus or to the body of another exercise apparatus. The adjustment device (3) is mounted to the body (1) of the Pilates apparatus by means of a flange (4) provided on the device (3). The flange (4) of the adjustment device (3) is similar to those known from the prior art. The coupling of the flange (4) to a side wall (2) of the Pilates apparatus is achieved by means of screw holes (4a) and screws. The focus of the present invention is the inner structure of the flange (4) and the manner of coupling the body (6) of the coupling ring (5) to the flange (4), as illustrated in FIGS. 5, 6, and 7. It is also focused here on how the tightening device (8) tightens the vertical arm (8) and on the construction of the coupling arm (9), as will be described below.

Figure 8:
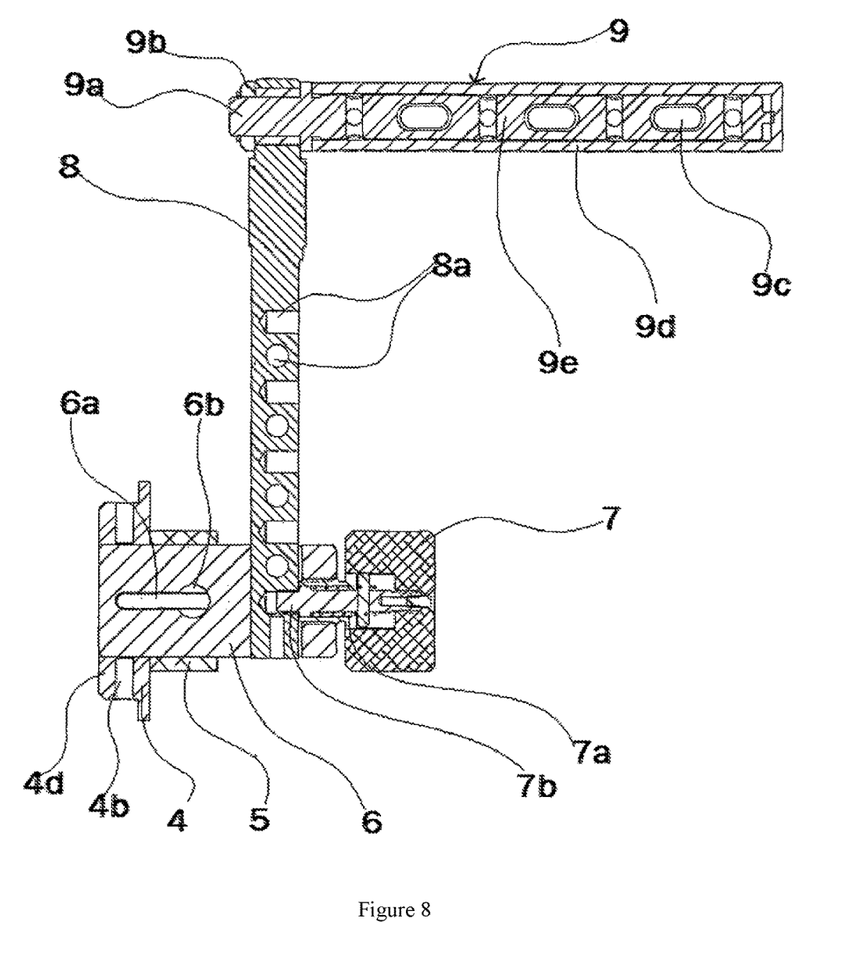
FIG. 8 is a side perspective illustration of the device according to the present invention.
Figure 9:
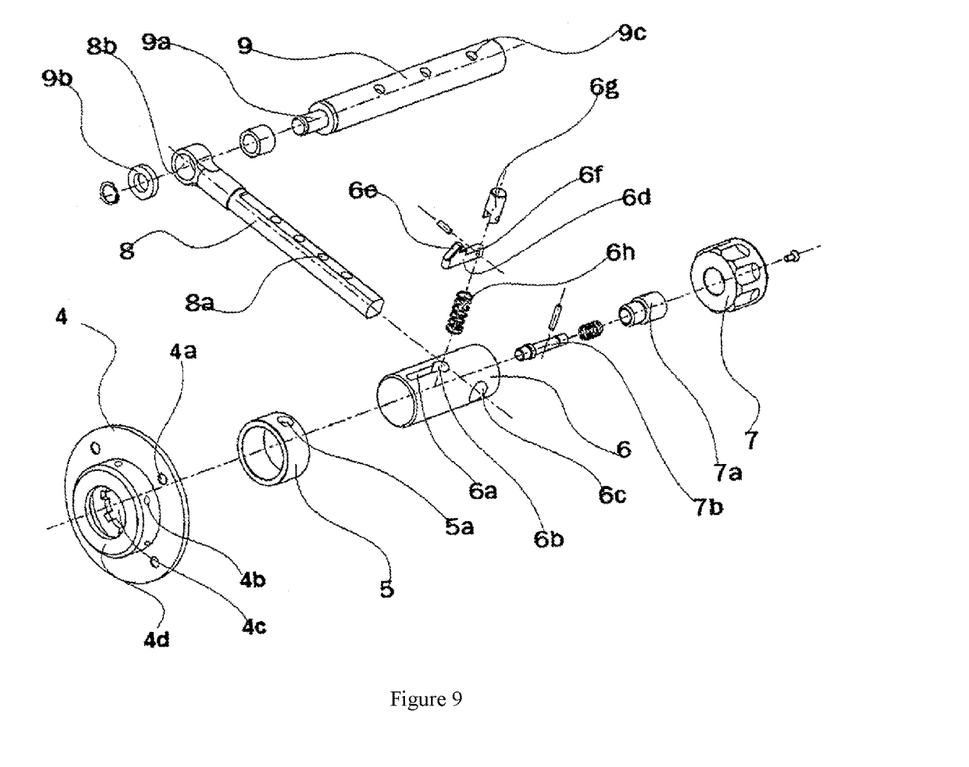
FIG. 9 is an exploded perspective illustration of the device according to the present invention.

As illustrated in FIGS. 5, 6 and 7, a body seat (4c) is disposed in the flange (4). The coupling body (6) is introduced into the body seat (4c). The body seat (6) is passed through the coupling ring (5) and rests against the flange (4). The vertical arm (8), in turn, is passed through the arm seat (6c) disposed on the coupling body (6). The coupling arm protrusion (9a) which connects the coupling arm (9) to the vertical arm (8) is introduced into the coupling arm seat (8b) on the vertical arm (8). The perspective illustration in FIG. 8 and the exploded illustration in FIG. 9 provide a clear view of the parts and how these parts are coupled to each other.

The first feature providing an easy adjustment in the adjustment device for exercise apparatuses according to the present invention is the manner the coupling body (6) is mounted to the flange (4) and the constriction thereof. Here, a flange protrusion (4d) is provided on the flange (4), said protrusion being invisible following assembly and remaining within the side wall (2) of the Pilates apparatus. Adjustment holes (4b) are opened on the flange protrusion (4d) at defined intervals. The adjustment protrusion (6e) is placed into these adjustment holes (4b), as will be described below. The flange (4) comprises the body seat (4c). One tip of the coupling body (6) is introduced into the body seat (4c). The coupling body (6) is further provided with a coupling ring (5) and this coupling ring (5) rests against the flange (4). A channel (6a) is provided on the coupling body (6), wherein the channel (6a) has a width and depth to receive a pressure bar (6d) in a movable manner. An adjustment protrusion (6e) is provided on a tip of the pressure bar (6d) to be introduced into the adjustment holes (4b). The other part is a pressure bar (6f), and a pressure pin (6g) which is a pin-like part is connected to this arm. A pressure spring (6h) is provided under the pressure bar (6d). During assembly, the pressure bar (6d) and the pressure pin (6f) are placed together so as to be introduced into the pressure bar (6d) channel (6a), and the pressure pin (6f) into the pin seat (6b). According to this placement, the pressure spring (6h) is disposed below the pressure bar (6d) so that the pressure spring (6h) can always push the pressure bar (6d) outward. In order to restrict this outward push action, the coupling ring (5) is placed out of the coupling body (6). The coupling ring (5) covers the channel (6a) and the pressure bar (6d) thereon (therein). However, only the pressure pin (6g) is passed through the pin hole (5a), a hole provided on the coupling ring (5), and is introduced out. In this case, when the pressure pin (6g) is depressed, it exerts pressure to the pressure bar (6d) and thus to the adjustment protrusion (6e) and brings it in. While the coupling body (6) is within the body seat (4c) in the flange (4) during assembly, the adjustment protrusion (6e) is within the adjustment holes (4b) the flange protrusion (4d). Thus, the coupling body (6) is rigid and cannot move. On the other hand, when the pressure pin (6g) is depressed by the band of a user, the adjustment protrusion (6e) will be released from the adjustment holes and the coupling body (6) can be freely turned in the body seat (4c) within the flange (4). This system is quite different from that of the prior art.

An arm seat (6c) is cut on the coupling body (6) to couple the vertical arm (8) to the coupling body (6). A gap is formed in the arm seat (6c) so that the vertical arm (8) is easily moved in the arm seat (6c). In order to keep the arm seat (6c) at a desired adjustment, however, a screw hole (6i) is opened on a tip portion of the coupling body (6) corresponding to the arm seat (6c). The tightening screw (7a) coupled to the tightening apparatus (7) and the tightening bar (7b) at the tip thereof are introduced through this screw hole (6i). The tightening screw (7a) can be connected to the tightening apparatus (7) in any type of assembly (e.g. welding, screwing, tightening or tight-fit etc.) or may be produced together during manufacture. The tightening bar (7b) is disposed in front of the tightening screw (7a). The tightening bar (7b) is moved through the screw hole (6i) when the tightening apparatus (7) and therefore the tightening screw (7a) are turned and is introduced into the tightening seats (8a) on the vertical arm (8) so that it tightens the vertical arm (8). Thus, the vertical arm (8) is made rigid. But if it is desired, the vertical arm (8) can also be moved freely within the arm seat (8c). In order to make it also possible to rotate the vertical arm (8) in the arm seat (6c), besides the back and forth movement, the tightening seats (8a) are opened on different surfaces of the vertical arm (8) by 90 degrees with respect to each other. For this reason, the profile of the vertical arm (8) which enters into the arm seat (6c) is in the form of a square. This form can obviously be a hexagonal form as well, or it may be a square form and the tightening seats (8a) may be formed at different angles. A coupling arm seat (8b) is formed on the tip of the vertical arm (8) in order to introduce the coupling arm protrusion (9a) which corresponds to the tip of the coupling arm (9). The coupling arm (9) is the place where a spring or flexible ropes are fastened in Pilates or other type of exercise apparatuses. For this reason, spring fastening holes (9c) are formed, which are provided with areas where the springs are connected (the springs are not illustrated in the figures). The coupling arm (9) is basically in the form of a tube with a filled or empty interior, One tip of the coupling arm (9) has a diameter which is sized to be introduced into the seat of the tightening arm (8b). The assembly of this part is completed by introducing the coupling arm protrusion (9a) into the tightening arm seat (8b) and tightening the coupling arm protrusion (9a) by means of a tightening nut or segment (9b). The coupling arm (9) is composed of an arm extension (9e) which is a tube with a filled or empty interior. The exterior of the area extension (9e) is covered by an arm sheath (9d). The spring fastening holes (9c) are passed through the arm sheath (9d) and arm extension (9e). Thus, the springs are fastened without deteriorating the appearance of the coupling arm (9), as is the case of the prior art.

The adjustment device for exercise apparatuses according to the present invention can be used in any type of sports and physiotherapy apparatuses, but primarily in Pilates apparatuses. The coupling manner of the adjustment device (3) between the flange (4) and the coupling body (6) allows to make an easy and rapid adjustment of the coupling body (6) and therefore the vertical arm (8) and the coupling arm (9). Additionally, the coupling manner of the vertical arm (8) to the coupling body (6) allows to connect the vertical arm (8) at any desired angle, so that it is not made movable in the back and forth direction only, but also rotationally. The connection manner of the coupling arm (9) to the vertical arm (8), in turn, both improves the aesthetical appearance and allows to fasten the springs (not illustrated in the figures) to the coupling arm (9). Hence, the present invention allows adjustments to be made by users of any age groups and of any health status.

What is claimed is:

1. An adjustment device for an exercise apparatus, comprising:
    a flange;
    a flange protrusion provided on the flange and is configured for being invisible following assembly and remaining within a side wall of the exercise apparatus;
    adjustment holes provided on the flange protrusion at defined intervals;
    a coupling body coupled to said flange by means of a pressure bar;
    an adjustment protrusion placed into said adjustment holes and a pressure pin;
    a channel being provided on said coupling body, wherein the channel has a width and a depth to receive the pressure bar in a movable manner;
    a coupling ring comprising two through openings through which the coupling body is passed and a pin hole where only the pressure pin is passed, wherein the coupling ring covers the channel, the pressure bar and the pressure pin;
    a vertical arm connected to said coupling body so as to be adjusted in a back and forth direction and rotationally; and
    a coupling arm connected to said vertical arm.

2. The adjustment device according to claim 1, wherein the coupling body further comprises a pressure spring disposed in said channel and below the pressure bar, a pin seat to receive the pressure pin, an arm seat to receive the vertical arm, and a screw hole to receive a a-tightening screw and a tightening bar.

3. The adjustment device according to claim 2, wherein the pressure bar comprises said adjustment protrusion and a pressure arm, wherein the pressure pin is connected to said pressure arm.

4. The adjustment device according to claim 1 wherein the pressure bar comprises said adjustment protrusion and a pressure arm, wherein the pressure pin is connected to said pressure arm.

5. The adjustment device according to claim 1, wherein the coupling body is kept within the coupling ring and that the pressure pin is kept within the pin hole during assembly.

6. The adjustment device according to claim 1, further comprising a tightening apparatus, wherein the tightening apparatus includes a tightening screw and a tightening bar.

7. The adjustment device according to claim 1, wherein a part of the vertical arm disposed in an arm seat has a square profile, a hexagonal profile or a circular profile, wherein the said part of the vertical arm comprises a tightening seat configured to receive a tightening bar and a coupling arm seat configured to receive an arm protrusion; wherein the tightening seats are opened on different surfaces of the vertical arm by 90 degrees with respect to each other.

8. The adjustment device according to claim 1, wherein the coupling arm includes an arm extension, an arm sheath surrounding said arm extension, spring fastening holes passing through said arm extension and the arm sheath, a coupling arm protrusion disposed in a tightening seat, a tightening nut or segment connecting said coupling arm extension to the vertical arm.

* * * * *